United States Patent [19]

Kim

[11] Patent Number: 5,200,589
[45] Date of Patent: Apr. 6, 1993

[54] MICROWAVE OVEN HAVING A FAN MOTOR ROTATION CONTROL FUNCTION

[75] Inventor: Jung R. Kim, Kangwon, Rep. of Korea

[73] Assignee: Gold Star Co., Ltd., Seoul, Rep. of Korea

[21] Appl. No.: 723,593

[22] Filed: Jul. 1, 1991

[30] Foreign Application Priority Data

Jun. 30, 1990 [KR] Rep. of Korea .................. 9539/1990

[51] Int. Cl.[5] .............................................. H05B 6/68
[52] U.S. Cl. ...................... 219/10.55 B; 219/10.55 R; 323/235; 323/246
[58] Field of Search .................. 219/10.55 B, 10.55 R, 219/400, 486; 323/300, 235, 319

[56] References Cited

U.S. PATENT DOCUMENTS

| | | | |
|---|---|---|---|
| 4,533,809 | 8/1985 | Eke | 219/10.55 B |
| 4,620,078 | 10/1986 | Smith | 219/10.55 B |
| 4,798,927 | 1/1989 | Kaminaka | 219/10.55 B |
| 4,804,916 | 2/1989 | Frank | 323/300 |
| 4,833,284 | 5/1989 | Park | 219/10.55 B |
| 4,888,461 | 12/1989 | Takano et al. | 219/10.55 B |
| 4,900,884 | 2/1990 | Aoki | 219/10.55 B |
| 4,900,885 | 2/1990 | Inumada | 219/10.55 B |
| 4,928,055 | 5/1990 | Kaieda et al. | 323/300 |

Primary Examiner—Bruce A. Reynolds
Assistant Examiner—Tuan Vinh To
Attorney, Agent, or Firm—Fish & Richardson

[57] ABSTRACT

A microwave oven having a fan motor rotation control function comprising an absolute humidity sensor for sensing the humidity inside the microwave oven, a fan motor for discharging water vapor inside the microwave oven externally, a microprocessor and a keyboard. The improved microwave oven further comprises a phototriac connected between said fan motor and a supplying line of AC power source for controlling AC power supplied to the fan motor in accordance with a plurality of control signals from the microprocessor and a zero crossing signal generating circuit for detecting a zero point from AC power voltage during a constant cycle to generate a predetermined width of pulse signal at the zero point and for applying the predetermined width of pulse signal the microprocessor. The microprocessor is adapted for inputting the pulse signal from the zero crossing signal generating circuit and for outputting the plurality of control signals to said phototriac in response to the pulse signal for control of the phototriac in accordance with a plurality of command signals from the keyboard and a output signal from the absolute humidity sensor. Therefore, the microwave oven according to the present invention can freely adjust the number of rotations of the fan motor according to the menu of the dish, thereby enabling the inside humidity to be correctly sensed.

2 Claims, 5 Drawing Sheets

MICROWAVE OVEN HAVING A FAN MOTOR ROTATION CONTROL FUNCTION

BACKGROUND OF THE INVENTION

1. Field of the Invention

The present invention relates in general to microwave oven having an absolute humidity sensor, and more particularly to an electronic range having a fan motor rotation control function which controls the number of rotations of the fan motor to allow the absolute humidity sensor to be at the optimum condition to sense a cooking state of a dish.

2. Description of the Prior Art

FIG. 1 is a schematic diagram of a construction of a conventional microwave oven having an absolute humidity sensor. As shown in the drawing, the conventional electronic range comprises a body 1, a magnetron 2 mounted on a right upper side inside the body 1, a high voltage transformer 3 disposed on a right lower side inside the body 1, a fan motor 5 disposed on a central portion of the rear side of the body 1, a fan 4 mounted to the fan motor 5, an air blowing duct 6 disposed toward a front upper side of the body 1, a door 18 disposed on the front side of the body 1, and an air blowing hole 19 disposed on a front right upper side of the body 1.

FIG. 2 is a schematic circuit diagram of the conventional microwave oven illustrated in FIG. 1. As shown in the drawing, one side of an AC power source is connected to a primary winding of a low voltage transformer 10 and to one terminal of a primary security switch 11 via a fuse 7, a magnetron thermostat 8 and an oven thermostat 9, and the other side thereof is connected to the primary winding of the low voltage transformer 10, to one terminal of a monitor switch driving relay 12 and to the fan motor 5 via a lamp 13 and a turntable motor 14. The one terminal of the primary security switch 11 connected to the oven thermostat 9 is also connected to the lamp 13 via a lamp driving relay 15 and to the turntable motor 14 and the fan motor 5 via a fan motor and turntable motor driving relay 16. The turntable motor 14 and the fan motor 5 are connected in parallel to each other. Also, between the other terminal of the primary security switch 11 and the other terminal of the monitor switch driving relay 12 are connected in parallel a monitor switch 17 and the high voltage transformer 3.

The conventional microwave oven is also provided with a control circuit 21 to which a door switch 20 is connected.

FIG. 3 is a detailed block diagram of the control circuit 21 illustrated in FIG. 2. As shown in this drawing, the control circuit 21 includes a microprocessor 22, a zero balance circuit 23, an absolute humidity sensor 24, a humidity detecting circuit 25, and a relay driving circuit 26.

Also, the conventional microwave oven is provided with a keyboard 27 mounted on an external control panel (not shown) thereof. This keyboard 27 is connected to the microprocessor 22.

The operation of the conventional microwave oven with the above-mentioned construction will now be described.

First, upon the applying of AC power to the low voltage transformer 10, the AC power is also applied to the control circuit 21. Under the condition that the door 18 of the microwave oven is closed, the microprocessor 22 outputs a plurality of control signals to the relay driving circuit 26 in response to a plurality of command signals received from the keyboard 27 mounted on the control panel. Upon receiving the control signals from the microprocessor 22, the relay driving circuit 26 outputs such signals as to turn on the lamp driving relay 15 and the fan motor and turntable motor driving relay 16. As the lamp driving relay 15 is turned on by the output signal from the relay driving circuit 26, the lamp 13 is turned on, thereby allowing a user to see a cooking state of a dish, or food or drink, inside the body 1 of the microwave oven. On the other hand, as the fan motor and turntable motor driving relay 16 is turned on by the output signal from the relay driving circuit 26, the turntable motor 14 and the fan motor 5 are applied with AC power, thereby allowing the fan 4 mounted to the fan motor 5 to be actuated to generate air. This air is blown through the air blowing hole 19 disposed on the front right upper side of the body 1, via the high voltage transformer 3, the magnetron 2 and the air blowing duct 6. At this time, under the condition that the monitor switch driving relay 12 is being turned off, only relays 15 and 16 are turned on, in order to blow moist air inside the body 1 of the microwave oven through the air blowing hole 19 for about 18 seconds. The reason why this operation must be performed will now be mentioned.

When another dish is put into the body 1 of the microwave oven after the cooking of a dish has been finished and the next cooking of another dish is to be tried, a large amount of water vapor generated from the first dish still remains inside the body 1. The absolute humidity sensor 24 when the next cooking is being carried out senses the relatively large amount of the water vapor inside the body 1 and outputs a signal according to the sensed state to the microprocessor 22 via the humidity detecting circuit 25 in the control circuit 21. For this reason, the microprocessor 22 malfunctions.

In order to solve the problem as mentioned above, the conventional microwave oven further comprises functions as follows:

Namely, under the condition that the monitor switch driving relay 12 is being turned off by the microprocessor 22 for about 18 seconds, the zero balance circuit 23 in the control circuit 21 zero-balances the absolute humidity sensor 24, thereby allowing the operation of the absolute humidity sensor 24 to normally begin with a constant reference voltage, or a zero balance point of time, regardless of the amount of the water vapor inside the body 1 of the microwave oven.

FIG. 4 is a waveform diagram of outputs from the absolute humidity sensor 24 illustrated in FIG. 3. As shown in the drawing, although the normal cooking is carried out after the zero-balancing of the absolute humidity sensor 24, water vapor is not generated inside the body 1 of the electronic range during a constant time period. That is, although the monitor switch driving relay 12 is turned on and the high voltage transformer 3 is thus applied with AC power thereby to actuate the magnetron 2, the dish inside the body 1 of the microwave oven is not at once heated, causing the generation of the water vapor therefrom. Because the fan motor and turntable motor driving relay 16 are always being turned on regardless of the menu of the dish, the turntable motor 14 and the fan motor 5 operate at the same load condition in accordance with AC power. The output voltage from the absolute humidity sensor 24 is decreased during a constant time period in accordance with the menu to be cooked, since amount of external water vapor is relatively less than that of water vapor inside the body 1 of the microwave oven during this constant time period. Namely, the output voltage from the absolute humidity sensor 24 is decreased until the dish is heated and the water vapor therefrom is thus generated. As the dish is being heated gradually, the increase in amount of the water vapor generated from the dish occurs step by step. As a result, the output voltage from the absolute humidity sensor 24 is increased.

The microprocessor 22 in the control circuit 21 perceives the output voltage from the absolute humidity sensor 24 and detects the minimum point (point of time t1 in FIG. 4) in accordance with the perceived state, during a constant time period after the zero-balancing of the absolute humidity sensor 24 (point of time t0 in FIG. 4). Then, the microprocessor 22 perceives the state (point of time t2 in FIG. 4) when the output voltage from the absolute humidity sensor 24 is increased and reaches a preselected value h in accordance with the menu of the dish.

As hereinbefore described, because the fan motor 5 is connected in parallel across the AC power source and is driven by the fan motor and turntable motor driving relay 16, the number of rotations thereof is varied in accordance with the voltage variation of the AC power source.

That is, when the larger voltage is applied from the AC power source, the fan motor 5 is rotated relatively faster, thereby causing the sensitivity of the absolute humidity sensor 24 to become worse relatively. For this reason, the variation width h at the point of time sensed by the absolute humidity sensor 24 is larger at the minimum point (point of time t1 in FIG. 4) after the zero-balancing of the absolute humidity sensor 24, thereby causing the absolute humidity sensor 24 to be liable to be influenced by an external noise. Also, because of non-linearity of the waveform of outputs from the absolute humidity sensor 24 as shown in FIG. 4, it is difficult for the microprocessor 22 is difficult to perceive the outputs from the absolute humidity sensor 24. In addition, because the number of rotations of the fan motor 5 is varied in accordance with the voltage variation of the AC power source, the speed of the wind thereof cannot be adjusted adequately according to the menu of the dish.

SUMMARY OF THE INVENTION

Therefore, it is an object of the present invention to provide an electronic range having a fan motor rotation control function which controls the number of rotations of the fan motor to allow the absolute humidity sensor to be at the optimum condition to sense a cooking state of a dish.

In accordance with the present invention, the object can be accomplished by providing an electronic range having a fan motor rotation control function comprising: a absolute humidity sensor for sensing the humidity inside the microwave oven; a keyboard for outputting a plurality of command signals for executing a menu of a dish to be cooked; a fan motor connected to a supplying line of AC power source, for discharging water vapor inside the electronic range externally; and a microprocessor for generating a plurality of control signals in accordance with the command signals from said keyboard and an output signal from said absolute humidity sensor; wherein the improvement comprising: switching means connected between said fan motor and said supplying line of AC power source, for controlling AC power supplied to said fan motor in accordance with the control signals from said microprocessor; and zero crossing signal generating means for detecting a zero point from AC power voltage during a constant cycle to generate a predetermined width of pulse signal at said zero point and for applying the predetermined width of pulse signal to said microprocessor; said microprocessor adapted for inputting said pulse signal from said zero crossing signal generating means and for outputting said plurality of control signals to said switching means in response to said pulse signal to control said switching means in accordance with the command signals from said keyboard and the output signal from said absolute humidity sensor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

First, a construction of an embodiment of a microwave oven in accordance with the present invention will be described with reference to FIGS. 5 and 6.

Figure 2:
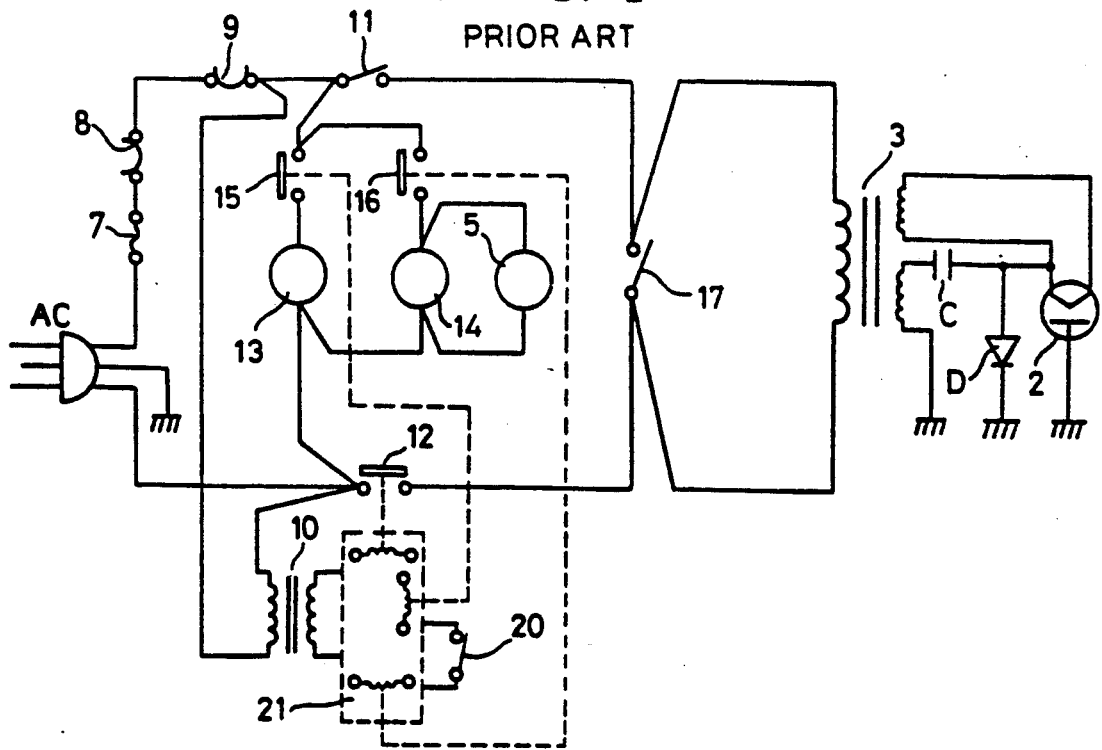
FIG. 2 is a schematic circuit diagram of the conventional electronic range illustrated in FIG. 1.
Figure 5:
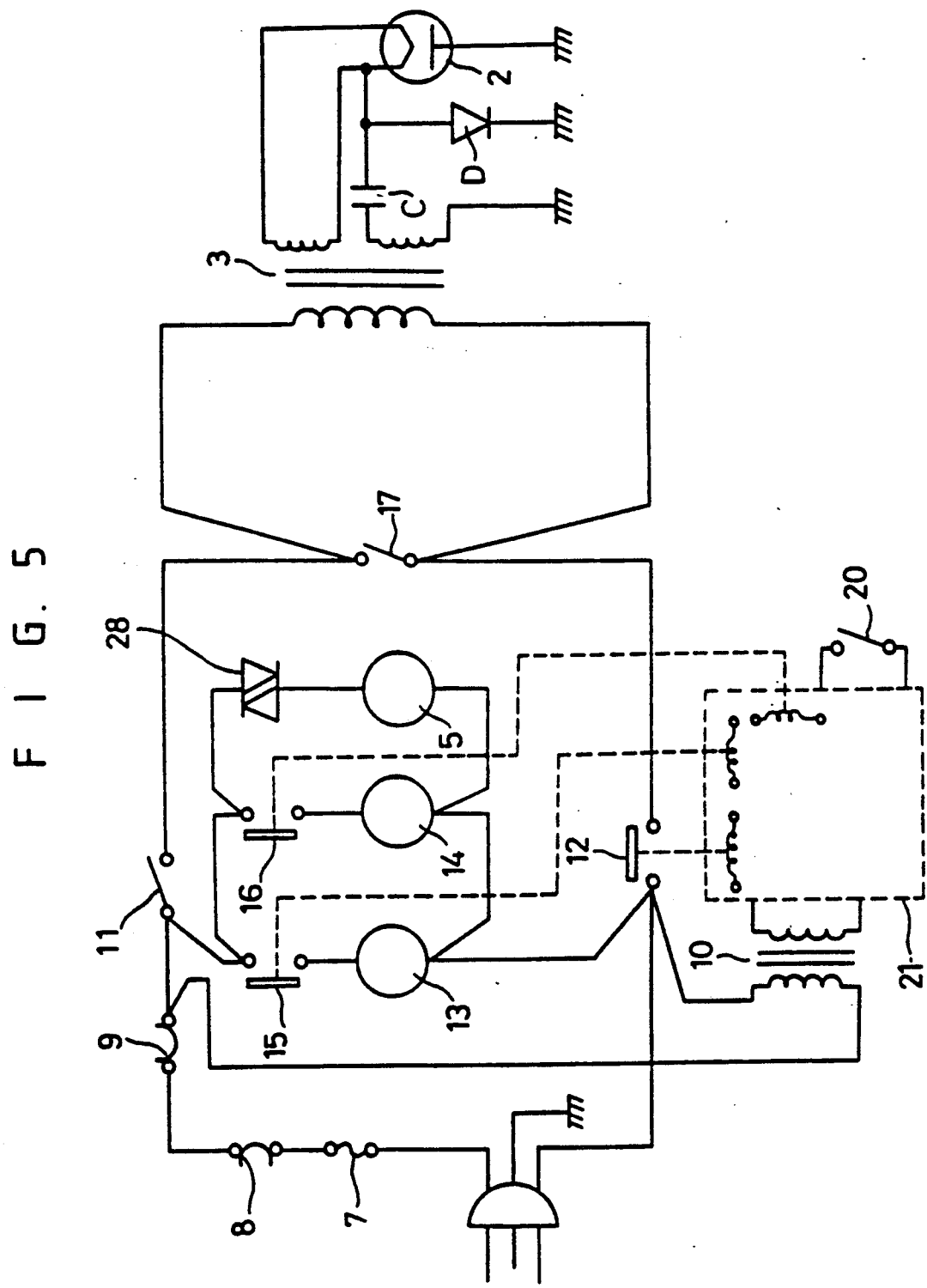
FIG. 5 is a schematic circuit diagram of a microwave oven employing a phototriac in accordance with the present invention.

FIG. 5 is a schematic circuit diagram of a microwave oven in accordance with the present invention. The construction of the microwave oven of the present invention in this drawing is identical to that of FIG. 2, except that the lamp driving relay 15 is adapted to control only lamp 13, the fan motor and turntable motor driving relay 16 is adapted to control only turntable motor 14, and the fan motor 5 is adapted to be controlled by a phase controllable phototriac 28.

Figure 3:
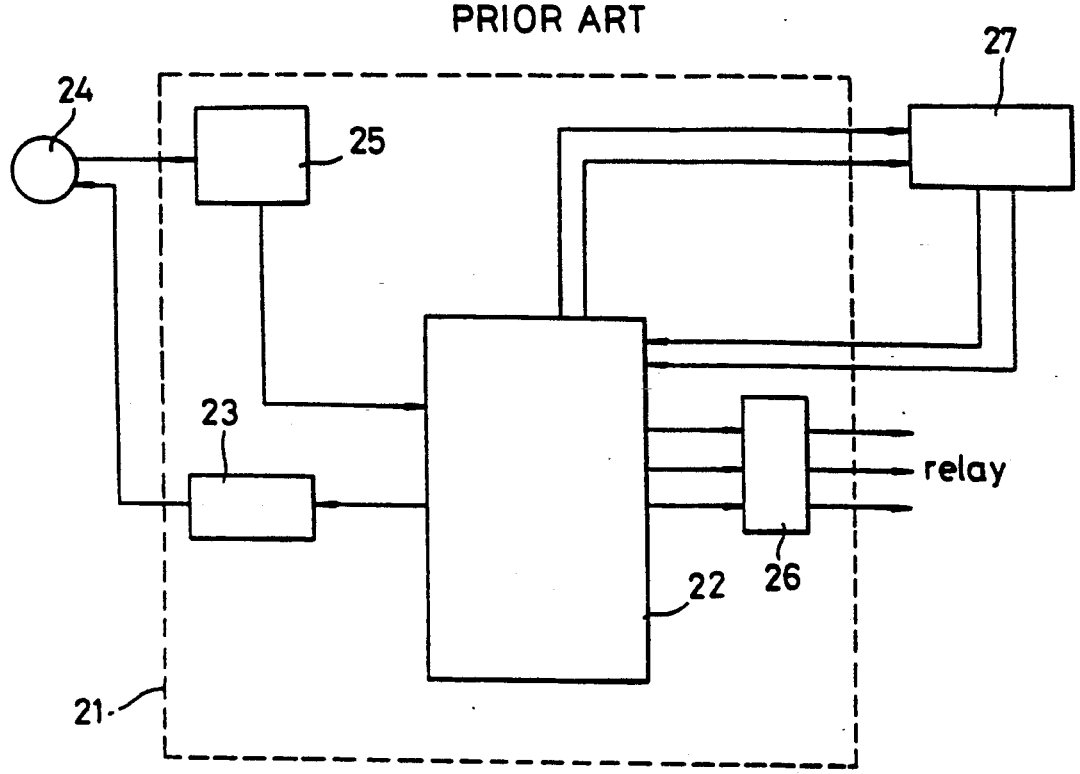
FIG. 3 is a detailed block diagram of a control circuit illustrated in FIG. 2.
Figure 6:
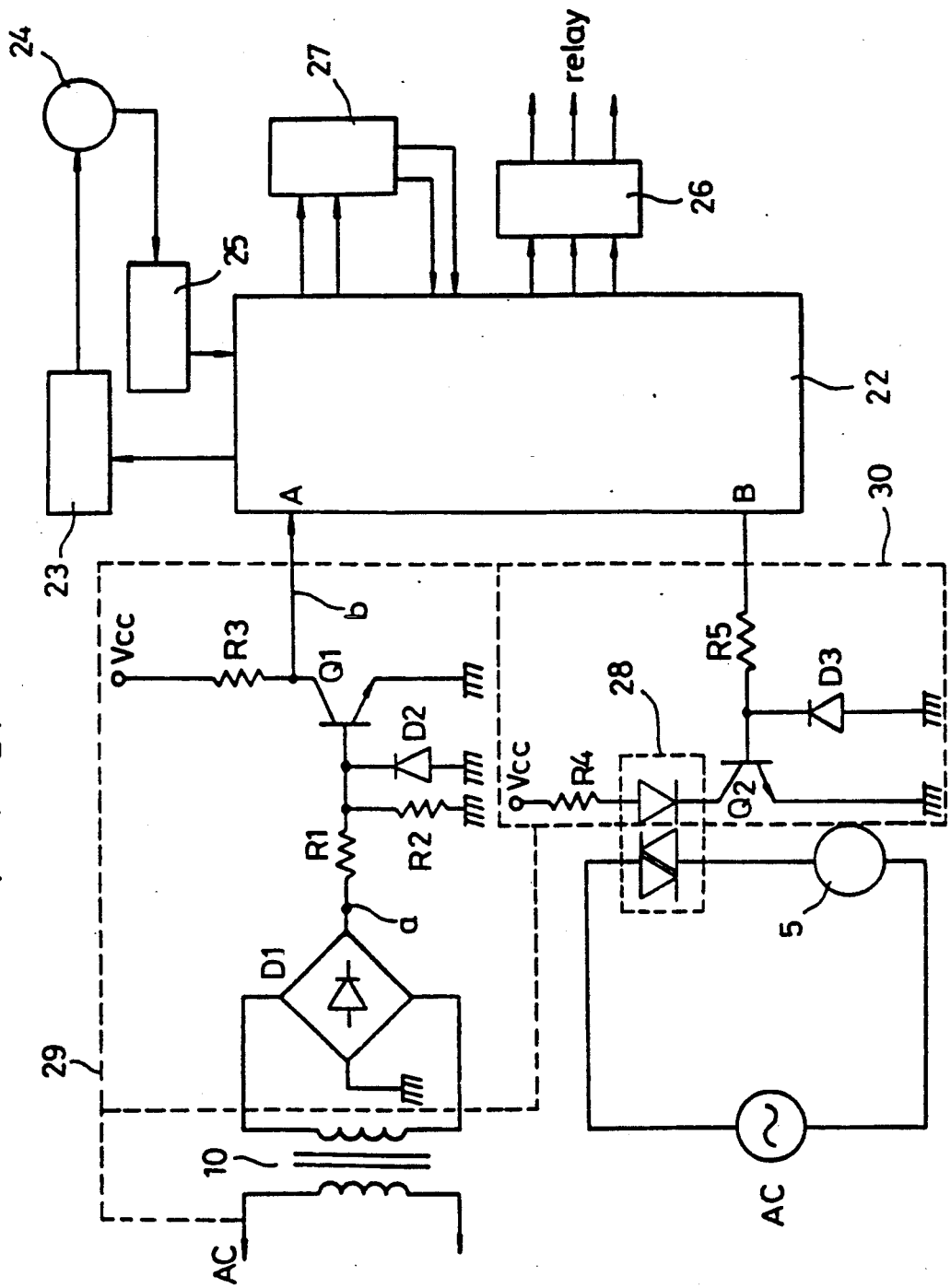
FIG. 6 is a detailed diagram of a fan motor control circuit according to the present invention.

FIG. 6 is a detailed diagram of a fan motor control circuit according to the present invention. As shown in this drawing, the fan motor control circuit according to the present invention further comprises a zero crossing signal generating circuit 29, the phototriac 28 and a phototriac driving circuit 30, in comparison with the conventional control circuit 21 illustrated in FIG. 3.

The zero crossing signal generating circuit 29 includes a bridge rectifying diode D1 connected across the secondary winding of the low voltage transformer 10 and a transistor Q1.

The bridge rectifying diode D1 is also connected via a resistor R1 to the base of the transistor Q1, to which a resistor R2 and a diode D2 are connected in parallel. On the other hand, the emitter of the transistor Q1 is connected to ground and the collector thereof is connected to DC power source Vcc via a resistor R3 and to a terminal A of the microprocessor 22.

The phototriac driving circuit 30 is provided with a transistor Q2 and a resistor R5 connected between the base of the transistor Q2 and a terminal B of the microprocessor 22. Also, the resistor R5 is connected to one end of a diode D3, the other end of which is connected to ground. On the other hand, the emitter of the transistor Q2 is connected to ground and the collector thereof is connected to DC power source Vcc via the phototriac 28 and a resistor R4.

Next, the operation of the microwave oven with the above-mentioned construction in accordance with the present invention will be described in detail.

Figure 7:
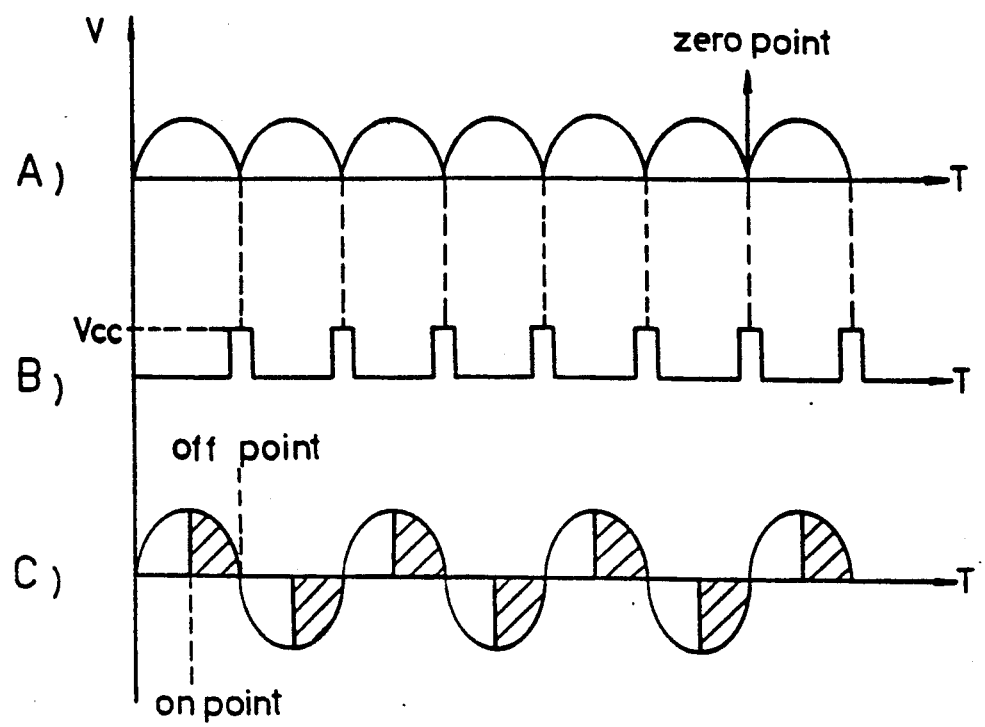
FIGS. 7a to 7c are waveform diagrams of signals from each component illustrated in FIG. 6.

First, if AC power is applied to the first winding of the low voltage transformer 10, the full-wave rectified signal according to the cycle of the AC power as shown in FIG. 7a appears at point a at output of the bridge rectifying diode D1 connected across the secondary winding of the low voltage transformer 10. The signal appearing at the point a is applied to the base of the transistor Q1.

Due to the NPN type of the transistor Q1, it is turned on while its base is applied with the signal full-wave rectified during the first cycle of the AC power, thereby causing its collector to be turned into a low level. Then, the transistor Q1 is turned off at zero point, or point before a signal full-wave rectified during the subsequent cycle incomes thereinto, and thus its collector is turned into a high level. For this reason, the transistor Q1 generates a zero crossing signal of a predetermined frequency (herein 120 Hz) as shown in FIG. 7b and outputs the zero crossing signal to the input terminal A of the microprocessor 22. Herein, the resistor R2 and the diode D2 are adapted to protect the transistor Q1 from a surge voltage.

Upon receiving command signals from the keyboard 27 mounted on the control panel under the condition that the door 18 of the microwave oven is closed, the microprocessor 22 it turns on the lamp driving relay 15 and the turntable motor driving relay 16, while turns off the monitor switch driving relay 12 via the zero balance circuit 23 during a predetermined time period (about 18 seconds), so that the absolute humidity sensor 24 can carry out the cooking of the dish at a constant reference voltage.

The microprocessor 22 then outputs a high level signal at its output terminal B to drive the fan motor 5 during the whole cycle of the AC power and also turns on the monitor switch driving relay 12 to apply the AC power to the high voltage transformer 3, thereby allowing the magnetron 2 to be actuated.

At the point of time the magnetron 2 operates normally, the microprocessor 22 perceives correctly command signals received from the keyboard 27 and then determines if it makes the rotation of the fan motor 5 fast or slow. The microprocessor 22 thus controls the cycle of the AC power (about 60 Hz) in accordance with the determined result.

FIG. 7c illustrates one example of the waveform of the AC power applied to the fan motor 5, the phase of which is controlled by the microprocessor 22 in accordance with the output signal from the keyboard 27 corresponding to the selected dish menu.

Figure 1:
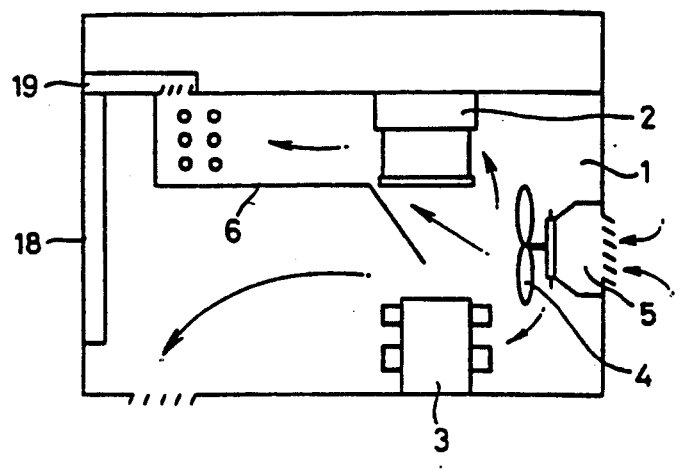
FIG. 1 is a schematic diagram of a construction of a conventional microwave oven having an absolute humidity sensor.

The AC power is applied to the fan motor 5 corresponding to the hatched areas in FIG. 7c, so that the number of rotations of the fan motor 5 can be adjusted. The adjustment of the number of rotations of the fan motor 5 in such a manner allows the high voltage transformer 3 disposed on the right lower side inside the body 1 and the low voltage transformer 10 disposed on the upper side inside the body 1 to get sufficiently cold. The air generated by the fan motor 5 is blown through the duct 6 and the air blowing hole 19 disposed on the front right upper side of the body 1 as shown in FIG. 1. At this time, the waveform of outputs from the absolute humidity sensor 24 is linear as shown in FIG. 8, and the microprocessor 22 in the control circuit 21 is thus sufficient to perceive correctly the outputs from the absolute humidity sensor 24.

Figure 4:
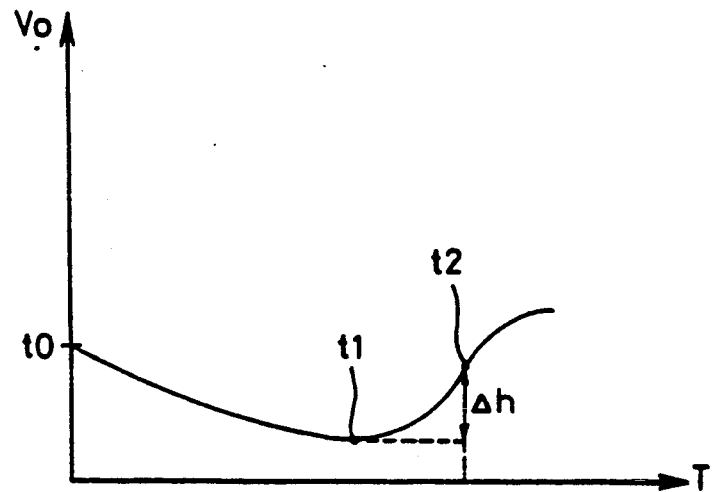
FIG. 4 is a waveform diagram of outputs from the absolute humidity sensor illustrated in FIG. 3.
Figure 8:
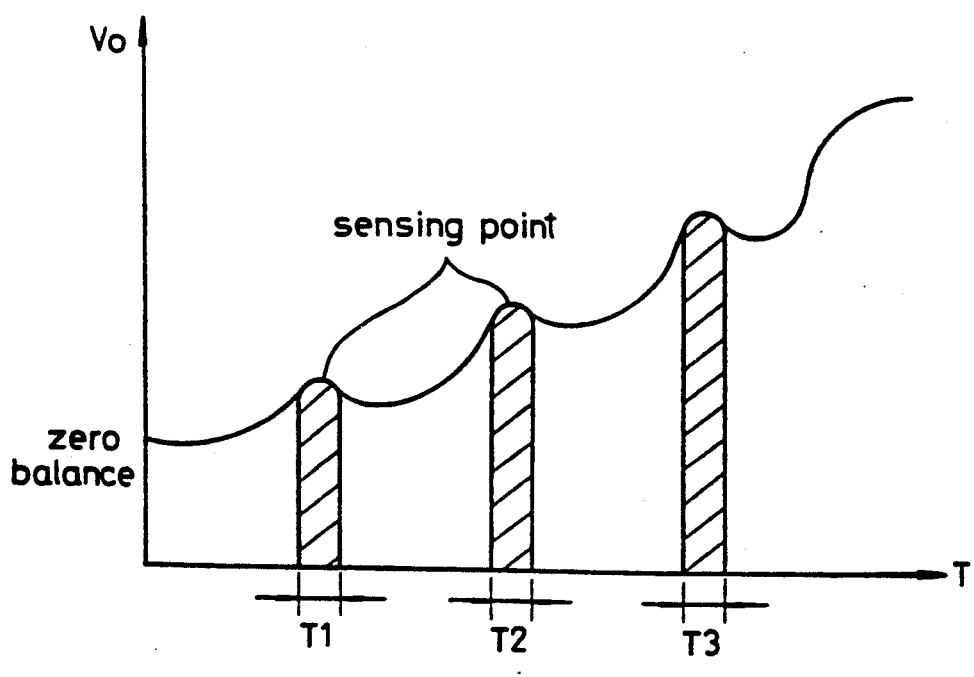
FIG. 8 is a waveform diagram of outputs from the absolute humidity sensor according to the present invention.

FIG. 8 is a waveform diagram of outputs from the absolute humidity sensor according to the present invention. As shown in this drawing, if the microprocessor 22 turns on/off the phototriac 28 for a constant cycle during a predetermined time period T the cooking of a dish is being carried out after the dish has been put into the body 1 of the microwave oven, the output waveform from the absolute humidity sensor 24 is protruded during the time period the fan motor 5 is not actuated, since a large amount of the water vapor generated from the dish remains inside the body 1 due to the non-operation of the fan motor 5 and the absolute humidity sensor 24 thus senses a relatively large amount of the water vapor inside the body 1. Namely, the microprocessor 22 can perceive correctly the amount of the water vapor inside the body 1 of the microwave oven according to the menu of the dish when the output waveform from the absolute humidity sensor 24 reaches its protruding points of time, or the maximum points T1, T2 and T3 in FIG. 4.

As hereinbefore described, in accordance with the present invention, the microwave oven having the absolute humidity sensor 24 can freely adjust the number of rotations of the fan motor 5 according to the menu of the dish. Therefore, the output waveform from the absolute humidity sensor 24 can be allowed to have a linearity, thereby enabling the inside humidity according to the menu of the dish to be correctly sensed.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A microwave oven having
   a humidity sensor,
   a keyboard,
   a fan motor, and
   a microprocessor, the improvement comprising:
   a) switching means connected between said fan motor and said supplying line of AC power source, for controlling AC power supplied to said fan motor;
   b) driving means for driving said switching means in accordance with a control signal from said microprocessor;
   c) zero crossing signal generating means for detecting a zero point from AC power voltage during a constant cycle to generate a predetermined width of pulse signal at said zero point and for applying the predetermined width of pulse signal to said microprocessor, said zero crossing signal generating means including a low voltage transformer for stepping down AC power voltage applied to its primary winding up to a set value, full wave rectifying means for full-wave rectifying the stepped down AC power voltage, and pulse generating means for generating the pulse signal of a predetermined width at said zero point of the full-wave rectified AC power voltage;

d) said microprocessor adapted for inputting said pulse signal from said zero crossing signal generating means and for outputting the control signal to said driving means in response to said pulse signal to control said switching means in accordance with the command signals from said keyboard and the output signal from said absolute humidity sensor.

2. A microwave oven having a fan motor rotation control function as set forth in claim 1, wherein said switching means includes a phototriac.

* * * * *